US005399436A

United States Patent [19]

Takayama et al.

[11] Patent Number: 5,399,436

[45] Date of Patent: Mar. 21, 1995

[54] ELECTRO-SENSITIVE THERMAL TRANSFER RECORDING MEDIUM

[75] Inventors: Hiroshi Takayama; Kenji Ogi, both of Kanagawa, Japan

[73] Assignee: Fuji Xerox Co., Ltd., Tokyo, Japan

[21] Appl. No.: 102,417

[22] Filed: Aug. 5, 1993

[30] Foreign Application Priority Data

Aug. 6, 1992 [JP] Japan .................................. 4-229394

[51] Int. Cl.$^6$ .............................................. B32B 15/08

[52] U.S. Cl. .................................... 428/458; 428/195; 428/207; 428/209; 428/473.5; 428/913

[58] Field of Search ................ 503/227; 428/195, 211, 428/480, 513, 913, 914, 458, 473.5, 913, 195, 207, 209; 346/76 PH, 1.1; 430/5

[56] References Cited

U.S. PATENT DOCUMENTS

| | | | |
|---|---|---|---|
| 4,253,775 | 3/1981 | Crooks et al. . | |
| 4,419,024 | 1/1983 | Bowlds et al. | 400/120 |
| 4,491,431 | 1/1985 | Aviram et al. | 400/241.1 |
| 4,897,669 | 1/1990 | Akutsu et al. | 346/76 PH |

FOREIGN PATENT DOCUMENTS

| | | |
|---|---|---|
| 56-10479 | 2/1981 | Japan . |
| 56-93585 | 7/1981 | Japan . |
| 59-21790 | 5/1984 | Japan . |
| 60-259485 | 12/1985 | Japan . |
| 62-196187 | 8/1987 | Japan . |
| 63-297084 | 12/1988 | Japan . |
| 1-113276 | 5/1989 | Japan . |
| 2-164592 | 6/1990 | Japan . |

*Primary Examiner*—Patrick J. Ryan
*Assistant Examiner*—William A. Krynski
*Attorney, Agent, or Firm*—Finnegan, Henderson, Farabow, Garrett & Dunner

[57] ABSTRACT

An electro-sensitive thermal transfer recording medium comprises a metal support, and an electric resistor layer which is formed on one side of the metal support and comprises a resin and a conductive powder, said resistor layer having an absolute value of a linear expansion coefficient of not larger than $2\times10^{-5}$/°C. in a temperature range of from 23° C. to 450° C., a tensile elongation of not larger than 5% at a stress of 0.5 Kgf/mm, and a volume specific resistance of from $10^{-1}$ to $10^3\Omega$cm at 23° C. The medium may have an ink layer on the resistor layer or on the opposite side of the metal support. Alternatively, a powder ink-retaining layer may be formed on the other side of the metal support. In the latter type of medium, a powder ink is applied to the ink-retaining layer for electro-sensitive thermal transfer recording.

17 Claims, 2 Drawing Sheets

ELECTRO-SENSITIVE THERMAL TRANSFER RECORDING MEDIUM

BACKGROUND OF THE INVENTION

1. Field Of The Invention

This invention relates to thermal transfer recording mediums which are adapted for use in an electro-sensitive thermal transfer recording process and more particularly, to an electro-sensitive thermal transfer recording medium which can be regenerated and is thus be repeatedly usable in the above process.

2. Description Of The Prior Art

A variety of electro-sensitive thermal transfer recording recording systems have been heretofore proposed, in which electric signals corresponding to image signals are transmitted to an ink medium provided with an anisotropic conductive layer and a heating resistor layer, thereby transferring an imagewise ink on a record medium. For instance, in Japanese Laid-open Patent Application Nos. 56-10479, 60-259485 and 1-113276, there are disclosed printing and recording processes wherein a powder ink is deposited on an electro-sensitive thermal transfer recording medium and thermally fused and, thus, an ink medium having the leveled ink layer is provided for use in printing and recording. In Japanese Laid-open Patent Application No. 63-297084, there is described a printing and recording process wherein a powder ink is electrostatically, uniformly deposited on an electro-sensitive thermal transfer recording medium and is transferred to a recording sheet in accordance with image signals.

Japanese laid-open Patent Application No. 62-196187 proposes an electro-sensitive thermal transfer recording medium which comprises a 2 to 30 μm thick metallic foil, a resistor layer composed of a resin matrix and a conductive powder other than metal powders formed on one side thereof, a polyethylene wax ink coated on the other side. The resin matrices include, for example, polyethylene, polystyrene, polyamides and the like. Moreover, Japanese Laid-open Patent Application No. 56-93585 sets forth an electro-sensitive thermal transfer recording medium which has a stainless steel foil substrate and a resistor layer composed of a polyimide and carbon.

However, the conventionally employed electro-sensitive thermal transfer heat recording mediums have the vital problem that they undergoes deformation owing to the application of heat at the time of printing and cannot thus be used repeatedly. For instance, the medium set out in the afore-mentioned Japanese Laid-open Patent Application No. 62-196187 makes use of resins, as the resin matrix, which are relatively low in heat resistance and mechanical strength. During a number of printing and recording cycles, the resistor layer undergoes deformation by application of electrically induced heat and by contact with a head under pressure. This leads to the disadvantage that precisely fine images of uniform quality cannot be repeatedly obtained.

With the case of Japanese Laid-open Patent Application No. 56-93585, the polyimide used cannot ensure good heat resistance and mechanical strength required for the electro-sensitive thermal transfer recording. In a number of printing cycles, the medium will likewise undergo deformation by application of electrically induced heat and by contact of a head under pressure.

Thus, the disadvantage is involved in that precisely fine images of uniform quality cannot be obtained.

SUMMARY OF THE INVENTION

It is accordingly an object of the invention to provide an electro-sensitive thermal transfer recording medium which overcomes the disadvantages of the prior art counterparts.

It is another object of the invention to provide an electro-sensitive thermal transfer recording medium which can be re-used after regeneration and which has good mechanical strength, heat resistance and heat stability whereby images with good quality can be obtained on repeated use.

It is a further object of the invention to provide an electro-sensitive thermal transfer recording medium whose electric resistor film has defined ranges of a linear expansion coefficient, a tensile elongation and a volume specific resistance with good mechanical and electric characteristics whereby the medium can be repeatedly used after regeneration and is able to yield thermal transfer prints without reduction in quality of the print when the medium can be repeatedly subjected to the electro-sensitive thermal transfer recording over a long time.

According to one embodiment of the present invention, there is provided an electro-sensitive thermal transfer recording medium which comprises:

a metal support; and an electric resistor layer which is formed on one side of the metal support and comprises a resin and a conductive powder, the resistor layer having an absolute value of a linear expansion coefficient of not larger than $2\times10^{-5}$/°C. in a temperature range of from 23° C. to 450° C., a tensile elongation of not larger than 5% at a stress of 0.5 $Kgf/mm^2$ at 450° C., and a volume specific resistance of from $10^{-1}$ to $10^3\Omega cm$ at 23° C.

According to another embodiment of the invention, there is also provided an electro-sensitive thermal transfer recording medium which comprises:

a metal support;

an electric resistor layer which is formed on one side of the metal support and comprises a resin and a conductive powder, the resistor layer having an absolute value of a linear expansion coefficient of not larger than $2\times10^{-5}$/°C. in a temperature range of from 23° C. to 450° C., a tensile elongation of not larger than 5% at a stress of 0.5 $Kgf/mm^2$ at 450° C., and a volume specific resistance of from $10^{-1}$ to $10^3\Omega cm$ at 23° C.; and a powder ink-retaining layer formed on the other side of the support.

PREFERRED EMBODIMENTS OF THE INVENTION

Figure 1:
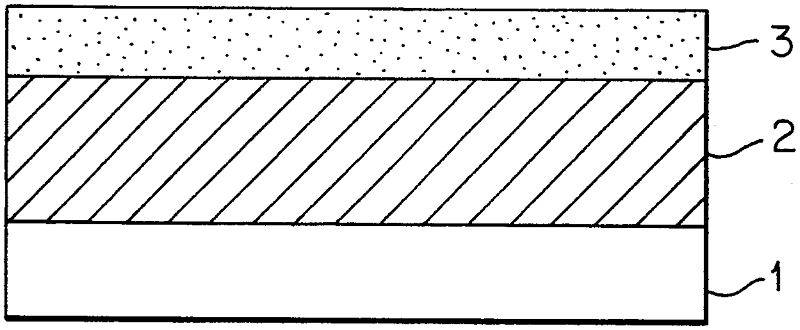
FIG. 1 is a schematic sectional view of an electro-sensitive thermal transfer recording medium according to one embodiment of the invention.
Figure 2:
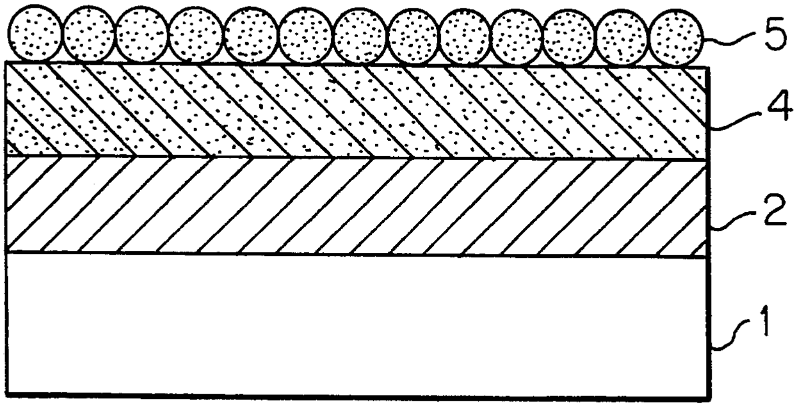
FIG. 2 is a schematic sectional view of an electro-sensitive thermal transfer recording medium according to another embodiment of the invention.

Reference is now made to the accompanying drawings and particularly, to FIGS. 1 and 2, in which like reference numerals indicate like parts.

FIG. 1 shows an electro-sensitive thermal transfer recording medium $M_1$ according to one embodiment of the invention. The medium $M_1$ includes a metal support 2 and an electric resistor layer 1 on the metal support 2. An ink layer 3 is formed on the opposite side of the metal support 2 to the resistor layer 1.

Likewise, FIG. 2 shows an electro-sensitive thermal transfer recording medium $M_2$ according to another embodiment of the invention. The medium $M_2$ includes a metal support 2, an electric resistor layer 1 formed on one side of the support 2, and a powder ink-retaining layer 4 formed on the other side of the support 2. Reference numeral 5 designates a powder ink.

The metal support 2 and the electric resistor layer 1 are common with both embodiments of the invention and are described below.

The metal support used in the recording mediums of the invention should preferably be made of stainless steels, nickel alloys, titanium alloys and the like. The support may be used in the form of a foil or sheet. The thickness of the support is generally in the range of from 5 to 15 μm. If the thickness exceeds the above range, heat generated at the time of printing is undesirably dissipated, resulting in an image with poorer resolving power. On the contrary, when the thickness is smaller than in the above range, such a foil becomes short of strength and thus, does not serve as a support.

The electric resistor layer formed on the metal support is able to generate the Joule heat by application of an electric current from a contact electrode, thereby generating heat. Usually, the resistor layer has a thickness of from 1 to 100 μm, preferably from 5 to 50 μm.

The electric resistor layer should have an absolute value of a linear expansion coefficient of not larger than $2\times10^{-5}$/°C. in a temperature range of from 23° C. to 450° C., a tensile elongation of not larger than 5% at a stress of 0.5 Kgf/mm$^2$, and a volume specific resistance of from $10^{-1}$ to $10^3$Ωcm at 23° C.

When the linear expansion coefficient in the temperature range of from 23° C. to 450° C. is smaller than $2\times10^{-5}$/°C., satisfactory heat stability cannot be obtained at the time of printing and recording. When such a medium is repeatedly used, thermal deformation takes place, resulting in the printing being impossible. When the tensile elongation at a stress of 0.5 Kgf/mm$^2$ is larger than 5% at 450° C., satisfactory mechanical strength cannot be obtained, printed portions will deform, for example, in the form of recesses. When the volume specific resistance is lower than $10^{-1}$Ωcm, an electric current being passed is unlikely to be converted into the Joule heat. On the contrary, when the volume specific resistance is higher than $10^3$Ωcm, an electric current is unlikely to pass, resulting in no generation of heat.

The electric resistor layer should comprise, at least, a resin and a conductive powder. The resins which can satisfy the above requirements may be selected from aromatic polyimides which are obtained by subjecting monomer mixtures comprising aromatic tetracarboxylic dianhydrides and aromatic diamines to polycondensation to obtain polyamido acids and then imidizing the polyamido acids. Examples of the aromatic polyimides useful in the present invention include polycondensates of pyromellitic dianhydride or biphenyltetracarboxylic dianhydride and phenylenediamine or diaminobiphenyl having bulky substituents at the 2, 2′ positions such as a trifluoromethyl group, a t-butyl group or the like substituent. More particularly, aromatic polyimides having recurring units of the following formulas are preferred

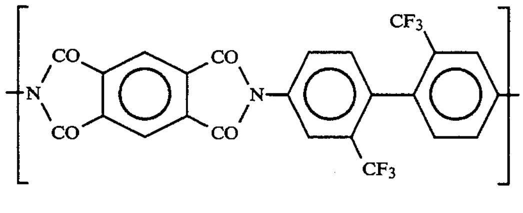

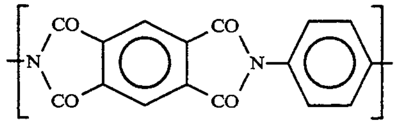

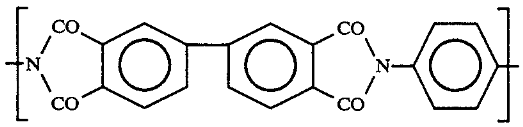

The conductive powder which is formulated with the above resin is one or more members selected from carbon black, graphite, TiC, TiN, $TiB_2$, $ZrB_2$ and metallic powders. Preferably, conductive carbon black such as acetylene black is used. The conductive powder is used in an amount sufficient to provide the volume specific resistance of the resistor film in the afore-defined range. The amount is generally in the range of from 10 to 50 wt %, preferably from 15 to 30 wt %, of the mixture.

In the recording medium according to the second embodiment of the invention, the powder ink-retaining layer is provided on the other side of the metal support. This layer serves to retain a powder ink as a uniform thin layer. The retaining layer should be made of a material from which the powder ink is readily releasable or transferable when fused. In general, the layer has a critical surface tension of not larger than 35 dynes/cm and an self-adhesion force of from 5 g/25 mm to 1000 g/25 mm when determined by a 90° peeling test.

In order to form such a powder ink retaining layer, viscoelastic materials are used including, for example, silicone rubbers, liquid silicones, modified silicones, fluorosilicone rubbers, silicone resins, silicone coatings and the like. The ink retaining layer should preferably have a thickness ranging from 0.3 to 10 μm.

In the practice of the invention, the electro-sensitive thermal transfer recording medium should have an ink layer on use. With the medium of the first embodiment, an ink layer may be formed on the electric resistor film and may be made of any known ink ordinarily used for this purpose. With the medium of the second embodiment of the invention, a powder ink is used. In this case, any known powder ink ordinarily used may also be employed. Preferably, ink particles which individually comprise a colorant in a thermally fusible resin and have an average size of from 2 to 20 μm are used.

Figure 3:
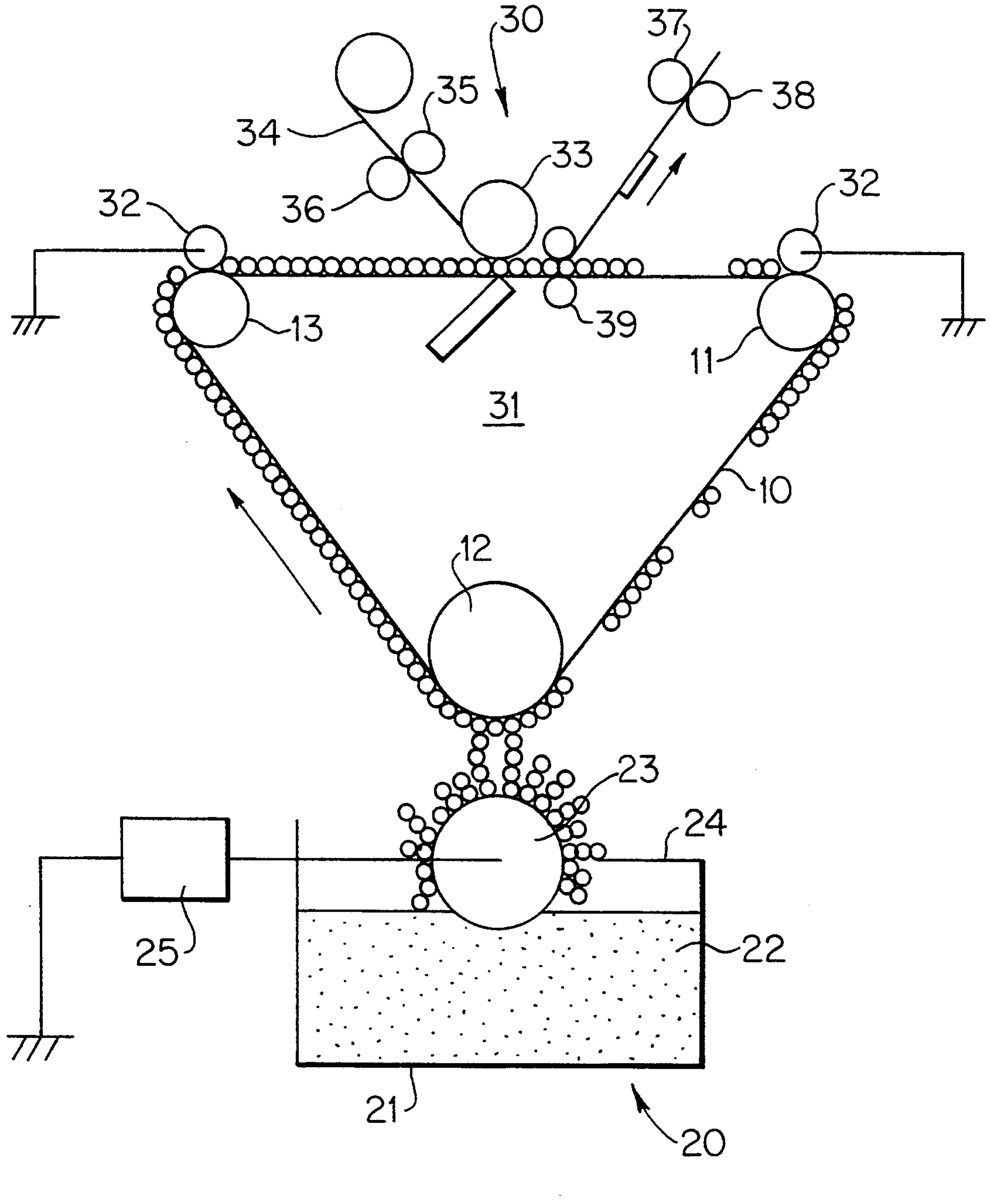
FIG. 3 is a schematic view of a printing and recording apparatus for carrying out electro-sensitive thermal transfer recording using the mediums of the invention.

The process for carrying out electro-sensitive thermal transfer recording using the recording mediums of the invention is described with reference to FIG. 3. FIG. 3 is a schematic view showing a printing and recording apparatus for use in electro-sensitive thermal transfer recording.

In the figure, an endless belt 10 made of an electro-sensitive thermal transfer recording medium of the invention having such a structure as shown in FIG. 2 is suspended with an ink medium transfer roll 11, a counter roll 12 and a tension roll 13.

A powder ink regeneration device 20 has a hopper 21 containing a powder ink 22, and a powder ink carrier 23 in contact with a powder ink 22 as shown in the figure. The powder ink carrier 23 is placed at a given space between it and the counter roller 12 and is applied with a bias potential from a bias power supply 25. The amount of the powder ink 22 to be deposited on the carrier 23 is controlled by means of a regulation member 24.

The printing and recording apparatus further includes a recording unit 30. The recording unit 30 includes a stylus head 31 with which electric signals corresponding to images are applied. The head 31 is provided in contact with the surface of the electric resistor film of the recording medium 10. The stylus head 31 is in face-to-face relation with a back side pressing roll 33 through the medium 10. In the vicinity and downstream of the stylus head 31 is provided a press unit 39. A record transfer medium 34 is passed by means record medium transfer rolls 35, 36, 37 and 38 and is contacted with the recording medium 10 in position. Reference numeral 32 indicates a return electrode roll.

In operation, the electro-sensitive thermal transfer recording medium is fed along the direction of the arrow in the figure by driving the ink medium transfer roll 11. In this state, the powder ink 22 is supplied to the powder ink retaining layer of the thermal transfer recording medium by means of the powder ink regeneration device thereby forming a powder ink layer, followed by feeding to the recording unit. In the recording unit, while the stylus head is in pressure contact with the surface of the electric resistor film, electric signals corresponding to images are applied to the thermal transfer recording medium. By the application, the electric resistor film generates heat in accordance with the electric signals, thereby fusing the powder ink of the powder ink layer. The powder ink layer is fed while contacting with the record medium, so that the fused powder ink is transferred to the record medium thereby forming a transfer image on the record medium. Where the electro-sensitive thermal transfer recording medium having the powder ink layer is not contacted with the record medium under pressure, the fused powder ink layer becomes thinner than the non-fused powder ink layer and thus, is not contacted with the record medium. This results in a transfer failure. Accordingly, it is necessary that the contact under pressure be satisfactory.

In the practice of the invention, the powder ink-retaining layer is so arranged as set out hereinabove, so that when the powder ink is supplied by means of the powder ink layer regeneration apparatus, a fresh powder ink is deposited on portions of the ink layer which are exposed by printing after the transfer. In this condition, an additional powder ink is not contact with and deposited on the electric resistor layer or the ink retaining layer. This permits deposition of substantially one layer of the powder ink with the thickness becoming uniform as corresponding to a particle size. In the present invention, it is not necessary that the powder ink deposited on the electric resistor film or powder ink-retaining layer be leveled by heat treatment, making it possible to stably deposit the powder ink substantially in the form of one layer.

The present invention is more particularly described by way of examples.

EXAMPLE 1

| | |
|---|---|
| Pyromellitic dianhydride | 100 moles |
| p-Phenylenediamine | 92 moles |
| Tetraaminobiphenyl | 8 moles |

The above compounds were reacted in an N-methyl-2-pyrrolidone solvent to obtain a solution containing 10% of polyamido acid as a solid matter. 2.5 parts by weight of carbon black (XC-72R: Cabot Inc. of U.S.A.) was added to 100 parts by weight of the polyamido acid solution, followed by dispersion in a ball mill. The resultant dispersion was cast on one side of a 10 μm thick titanium foil (TR28C, Toyo Seihaku Co., Ltd.), followed by imidization in an atmosphere of nitrogen at 450° C. The resultant dispersion was cast on one side of a 7 μm thick stainless steel (SUS304H) foil, followed by imidization in an atmosphere of nitrogen at 450° C. As a result, there was obtained an electro-sensitive thermal transfer recording medium which had a 3 μm thick electric resistor film formed on the stainless steel foil.

Separately, the resin film which was the same as the electric resistor layer in the above electro-sensitive thermal transfer recording medium was made and subjected to measurements. The results of the measurements revealed that the resin film had a linear expansion coefficient of $1.2\times10^{-5}$/°C. in a temperature range of 23° C. to 450° C. and a tensile elongation of 1.5% under conditions of a temperature of 450° C. and a tensile stress of 0.5 $Kgf/mm^2$. In addition, the volume specific resistance at 23° C. was found to be 2.5Ωcm.

The stainless steel foil was further coated on the other side with an ink comprising a dispersion of 7 wt % of carbon black colorant in polyethylene wax having a softening point of 75° C. in a thickness of 3 μm, thereby obtaining a ribbon. The thus obtained ribbon was used for electro-sensitive thermal transfer recording. As a result, good thermal transfer prints could be obtained. When 100 cycles of the electro-sensitive thermal transfer printing were repeated, the recording medium was not found as deformed, with good thermal transfer prints being obtained.

EXAMPLE 2

Biphenyltetracarboxylic anhydride and p-phenylenediamine were reacted at a molar ratio of 1:1 in an N-methyl-2-pyrrolidone solvent, thereby obtaining a solution containing 10% of polyamido acid as a solid matter. 2.0 parts by weight of carbon black (XC-72R: Cabot Inc. of U.S.A.) was added to 100 parts by weight of the polyamido acid solution, followed by dispersion in a ball mill. The resultant dispersion was cast on a 10 μm thick titanium foil (TR28C, Toyo Seihaku Co., Ltd.), followed by imidization in an atmosphere of nitrogen at 450° C. As a result, a 5 μm thick electric resistor layer was formed on the titanium foil. The electric resistor layer had a linear expansion coefficient of $1.8\times10^{-5}$/°C. in a temperature range of 23° C. to 450° C. and a tensile elongation of 1.7% under conditions of a temperature of 450° C. and a tensile stress of 0.5 $Kgf/mm^2$. In addition, the volume specific resistance at 23° C. was found to be 15.6Ωcm.

The titanium foil was further coated on the other side with a silicone resin (crosslinked product of KR-2706, Shin-Etsu Chemical Co., Ltd.), thereby forming a 4 μm thick powder ink-retaining layer (self-adhesion force: 50 g/25 mm) to obtain an electro-sensitive thermal transfer recording medium.

A powder with an average size of 7 μm was obtained by kneading and powdering 100 parts by weight of a polyester resin having a softening point of 120° C. and 30 parts by weight of iron black powder. 0.8 parts by weight of carbon black was mixed with and deposited on 100 parts by weight of the powder to obtain a conductive magnetic powder ink. The ink was deposited on the ink-retaining layer of the thermal transfer recording medium in the form of one layer to obtain a ribbon. The thus obtained ribbon was used for electro-sensitive thermal transfer recording. As a result, clear thermal transfer prints of characters were obtained. When 100 cycles of the electro-sensitive thermal transfer printing were performed, no deformation of the recording medium was observed, with good thermal transfer prints being obtained wherein the quality of the images such as characters was not degraded.

EXAMPLE 3

Biphenyltetracarboxylic anhydride and p-phenylenediamine were reacted at a molar ratio of 1:1 in an N-methyl-2-pyrrolidone solvent, thereby obtaining a solution containing 10% of polyamido acid as a solid matter. 8.0 parts by weight of titanium carbide (TiC-007, Shin Nippon Metal Co., Ltd.) was added to 100 parts by weight of the polyamido acid solution, followed by dispersion in a ball mill. The resultant dispersion was cast on a 10 μm thick titanium foil (Toyo Seihaku Co., Ltd.), followed by imidization in an atmosphere of nitrogen at 450° C. As a result, a 5 μm thick electric resistor layer was formed on the titanium foil. The electric resistor layer had a linear expansion coefficient of $1.8\times10^{-5}$/°C. in a temperature range of 23° C. to 450° C. and a tensile elongation of 1.4% under conditions of a temperature of 450° C. and a tensile stress of 0.5 $Kgf/mm^2$. In addition, the volume specific resistance at 23° C. was found to be 132Ωcm.

The titanium foil was further coated on the other side with a silicone resin for powder ink retention (crosslinked product of KR-2706, Shin-Etsu Chemical Co., Ltd.) in a thickness of a 4 μm to obtain an electro-sensitive thermal transfer recording medium.

A powder with an average size of 7 μm was obtained by kneading and powdering 100 parts by weight of a polyester resin having a softening point of 120° C. and 30 parts by weight of iron black powder. 0.8 parts by weight of carbon black was mixed with and deposited on 100 parts by weight of the powder to obtain a conductive magnetic powder ink. The ink was uniformly deposited on the ink-retaining layer of the thermal transfer recording medium in the form of one layer to obtain a ribbon. The thus obtained ribbon was used for electro-sensitive thermal transfer recording. As a result, clear thermal transfer prints of characters were obtained. When 100 cycles of the electro-sensitive thermal transfer printing were performed, no deformation of the recording medium was observed, with good thermal transfer prints being obtained wherein the quality of the images such as characters was not degraded.

COMPARATIVE EXAMPLE

Pyromellitic dianhydride and oxydianiline were reacted at a molar ratio of 1:1 in an N-methyl-2-pyrrolidone solvent, thereby obtaining a solution containing 10% of polyamido acid as a solid matter. 2.5 parts by weight of titanium carbon black (XC-72R: Cabot Inc. of U.S.A.) was added to 100 parts by weight of the polyamido acid solution, followed by dispersion in a ball mill. The resultant dispersion was cast on a 7 μm thick stainless steel (SUS304H) foil, followed by imidization in an atmosphere of nitrogen at 450° C. As a result, there was obtained an electro-sensitive thermal transfer recording medium having a 3 μm thick electric resistor layer formed on the stainless steel foil.

The electric resistor layer had a linear expansion coefficient of $2.5\times10^{-5}$/°C. in a temperature range of 23° C. to 450° C. and a tensile elongation of 6.5% under conditions of a temperature of 450° C. and a tensile stress of 0.5 $Kgf/mm^2$. In addition, the volume specific resistance at 23° C. was found to be 2.5Ωcm.

The stainless steel foil was further coated on the other side with an ink comprising a dispersion of 7 wt % of carbon black in polyethylene wax having a softening point of 75° C. in a thickness of 3 μm to obtain a ribbon. The thus obtained ribbon was used for electro-sensitive thermal transfer recording. As a result, a good thermal transfer print was obtained only at the first time but a second cycle of the thermal transfer printing could not be performed because of the great deformation of the medium.

What is claimed is:

1. An electro-sensitive thermal transfer recording medium which comprises:

a metal support;

an electric resistor layer which is formed on one side of said metal support and comprises a resin and a conductive powder, said resistor layer having an absolute value of a linear expansion coefficient of not larger than $2\times10^{-5}$/°C. in a temperature range of from 23° C. to 450° C., a tensile elongation of not larger than 5% at 450° C. at a stress of 0.5 $Kgf/mm^2$, a volume specific resistance of from $10^{-1}$ to $10^3$Ωcm at 23° C., and a thickness of from 1 to 100 μm wherein said resin is selected from the group consisting of aromatic polyimides which are obtained by polycondensation of aromatic tetracarboxylic dianhydride and aromatic diamines and imidization of the resultant polycondensates and wherein said resin is further a polyimide having the recurring units of one of the following formulae

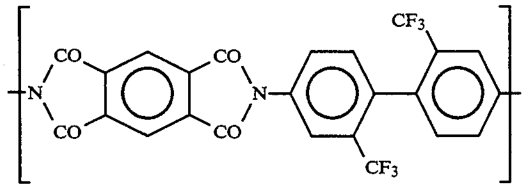

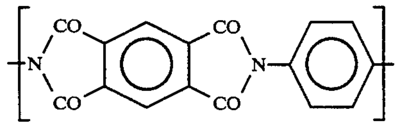

-continued

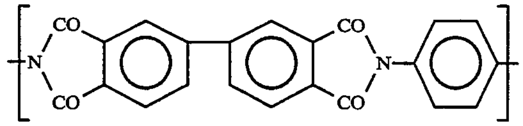 ; and a powder ink-retaining layer having a powder ink thereon or an ink layer formed on the other side of said support.

2. The thermal transfer recording medium according to claim 1, wherein said metal support has a thickness of from 5 to 15 μm.

3. The thermal transfer recording medium according to claim 1, wherein said conductive powder is conductive carbon.

4. The thermal transfer recording medium according to claim 1, wherein said conductive powder is present in said electric resistor layer in an amount of from 10 to 50 wt %.

5. The thermal transfer recording medium according to claim 1, further comprising an ink layer formed on the other side of said metal support.

6. The thermal transfer recording medium according to claim 5, further comprising an ink layer having a binder resin and a colorant dispersed therein.

7. An electro-sensitive thermal transfer recording medium which comprises:

a metal support;

an electric resistor layer which is formed on one side of said metal support and comprises a resin and a conductive powder, said resistor layer having an absolute value of a linear expansion coefficient of not larger than $2\times10^{-5}$/°C. in a temperature range of from 23° C. to 450° C., a tensile elongation of not larger than 5% at 450° C. at a stress of 0.5 Kgf/mm$^2$, and a volume specific resistance of from $10^{-1}$ to $10^3$Ωcm at 23° C.; and a powder ink-retaining layer having a powder ink thereon or an ink layer formed on the other side of said support.

8. The thermal transfer recording medium according to claim 7, wherein said metal support has a thickness of from 5 to 15 μm.

9. The thermal transfer recording medium according to claim 7, wherein said electric resistor has a thickness of from 1 to 100 μm.

10. The thermal transfer recording medium according to claim 7, wherein said resin is selected from the group consisting of aromatic polyimides which are obtained by polycondensation of aromatic tetracarboxylic dianhydride and aromatic diamines and imidization of the resultant polycondensates.

11. The thermal transfer recording medium according to claim 10, wherein said resin is a polyimide having recurring units of the following formula

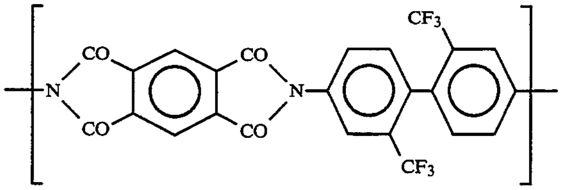

12. The thermal transfer recording medium according to claim 10, wherein said resin is a polyimide having recurring units of the following formula

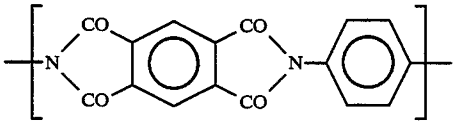

13. The thermal transfer recording medium according to claim 10, wherein said resin is a polyimide having recurring units of the following formula

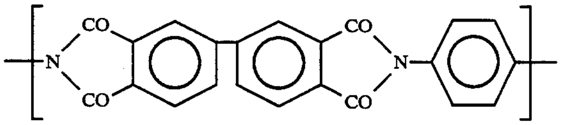

14. The thermal transfer recording medium according to claim 7, wherein said conductive powder is conductive carbon.

15. The thermal transfer recording medium according to claim 7, wherein said conductive powder is present in said electric resistor layer in an amount of from 10 to 50 wt %.

16. The thermal transfer recording medium according to claim 7, wherein said powder ink-retaining layer has a critical surface tension of not larger than 35 dynes/cm and a self-adhesion force of 5 g/25 mm to 1000 g/25 mm when determined by a 90° peeling test.

17. The thermal transfer recording medium according to claim 7, wherein said powder ink-retaining layer is made of a viscoelastic material and has a thickness ranging from 0.3 to 10 μm.

* * * * *